US012660027B2

(12) United States Patent　　　　(10) Patent No.:　US 12,660,027 B2
Tsai et al.　　　　　　　　　　　　　(45) Date of Patent:　Jun. 16, 2026

(54) METHOD AND APPARATUS TO HAVE EFFICIENT RESOURCE SHARING FOR UE WITH MULTIPLE SIM CARDS

(71) Applicant: MEDIATEK INC., Hsinchu (TW)

(72) Inventors: Chun-Fan Tsai, Hsinchu (TW); Kun-Lin Wu, Hsinchu (TW); Mu-Tai Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 347 days.

(21) Appl. No.: 18/368,597

(22) Filed: Sep. 15, 2023

(65) Prior Publication Data

US 2024/0107608 A1　　Mar. 28, 2024

Related U.S. Application Data

(60) Provisional application No. 63/377,356, filed on Sep. 28, 2022.

(51) Int. Cl.
*H04W 76/19*　　　(2018.01)
*H04W 76/30*　　　(2018.01)
*H04W 88/06*　　　(2009.01)

(52) U.S. Cl.
CPC ........... *H04W 76/19* (2018.02); *H04W 76/30* (2018.02); *H04W 88/06* (2013.01)

(58) Field of Classification Search
CPC ... H04W 76/27; H04W 60/005; H04W 68/12; H04W 72/21; H04W 76/30; H04W 76/19; H04W 88/06
See application file for complete search history.

(56) References Cited

U.S. PATENT DOCUMENTS

| | | | | |
|---|---|---|---|---|
| 2010/0159924 A1* | 6/2010 | Lagerman | ............... | H04W 8/26 455/433 |
| 2013/0267261 A1* | 10/2013 | Nikkelen | .............. | H04W 68/00 455/458 |
| 2014/0378152 A1* | 12/2014 | Anand | .................. | H04W 76/16 455/452.1 |
| 2016/0080981 A1* | 3/2016 | Wang | ................ | H04W 36/1446 370/331 |
| 2019/0069193 A1* | 2/2019 | Astrom | ............. | H04W 28/0205 |

(Continued)

OTHER PUBLICATIONS

European Search Report, Feb. 29, 2024, Germany.

(Continued)

*Primary Examiner* — Dung Hong
(74) *Attorney, Agent, or Firm* — Troutman Pepper Locke LLP; Tim Tingkang Xia, Esq.

(57)　　　　　　ABSTRACT

In an aspect of the disclosure, a method, a computer-readable medium, and an apparatus are provided. The apparatus may be a UE. In certain configurations, the UE enters a first radio resource control (RRC) connection with a first base station of a first network. The UE receives, from the first base station, an indication that enables the UE to send a first request for deactivating or releasing resources used for communications with the first base station. In response to a determination to enter a second RRC connection with a second base station of a second network, the UE sends, to the first base station, the first request for deactivating or releasing the resources. The UE enters the second RRC connection with the second base station while maintaining the first RRC connection with the first base station.

20 Claims, 11 Drawing Sheets

(56)        References Cited

U.S. PATENT DOCUMENTS

| 2021/0212155 | A1* | 7/2021 | Huang-Fu ....... H04W 36/00224 |
| 2022/0053448 | A1* | 2/2022 | Velev .................. H04W 60/005 |
| 2022/0360664 | A1* | 11/2022 | Lovlekar ......... H04W 36/00692 |
| 2022/0408518 | A1* | 12/2022 | Bergström .......... H04W 60/005 |
| 2023/0292193 | A1* | 9/2023 | Selvaganapathy ........................... H04W 36/0069 |
| 2024/0196195 | A1* | 6/2024 | Shrivastava .......... H04W 72/21 |
| 2024/0260133 | A1* | 8/2024 | Kim ...................... H04W 88/06 |
| 2024/0267814 | A1* | 8/2024 | Kim ...................... H04W 76/15 |
| 2024/0306249 | A1* | 9/2024 | Fan ...................... H04W 76/15 |
| 2024/0334259 | A1* | 10/2024 | Selvaganapathy ........................... H04W 36/0027 |

OTHER PUBLICATIONS

3GPP TSG RAN Meeting #93-e, RP-212506, Electronic Meeting, Sep. 13-17, 2021.

3GPP TSG RAN WG2 Meeting #117 electronic, R2-2202795, E-Meeting, Feb. 21-Mar. 3, 2022.

3GPP TSG RAN WG2 #119bis-e, R2-2210514, eMeeting, Oct. 10-19, 2022.

3GPP TSG RAN #94e RP-212676, Electronic Meeting, Dec. 6-17, 2021.

\* cited by examiner

506

504

502

500

PDCCH

DL Data

Common
UL Burst

700

Network
A

Network
B

720

730

740     750

SIM1
Data
Flow

710

SIM2
Data
Flow

SIM1

SIM2

712

714

800

900

1000

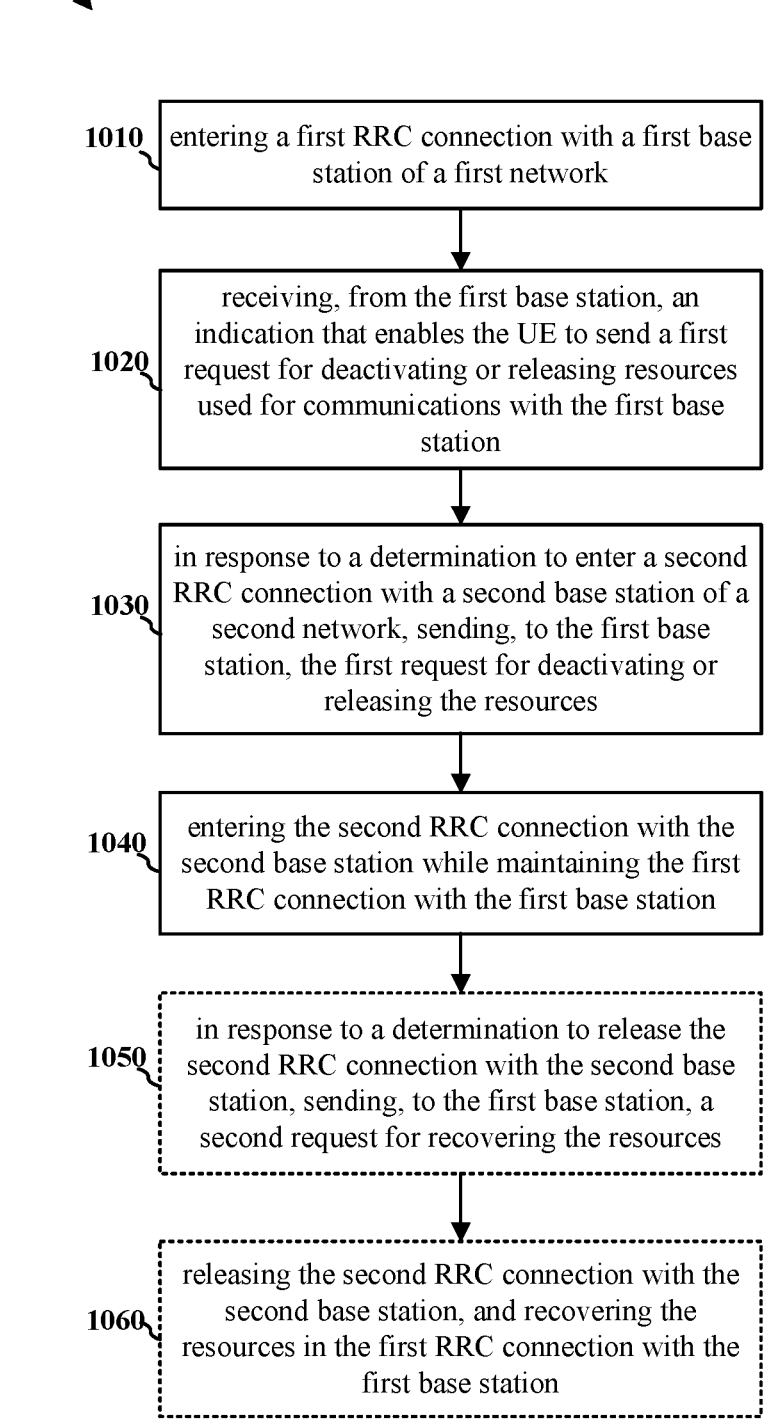

1010   entering a first RRC connection with a first base station of a first network 1020   receiving, from the first base station, an indication that enables the UE to send a first request for deactivating or releasing resources used for communications with the first base station 1030   in response to a determination to enter a second RRC connection with a second base station of a second network, sending, to the first base station, the first request for deactivating or releasing the resources 1040   entering the second RRC connection with the second base station while maintaining the first RRC connection with the first base station 1050   in response to a determination to release the second RRC connection with the second base station, sending, to the first base station, a second request for recovering the resources 1060   releasing the second RRC connection with the second base station, and recovering the resources in the first RRC connection with the first base station

FIG. 10

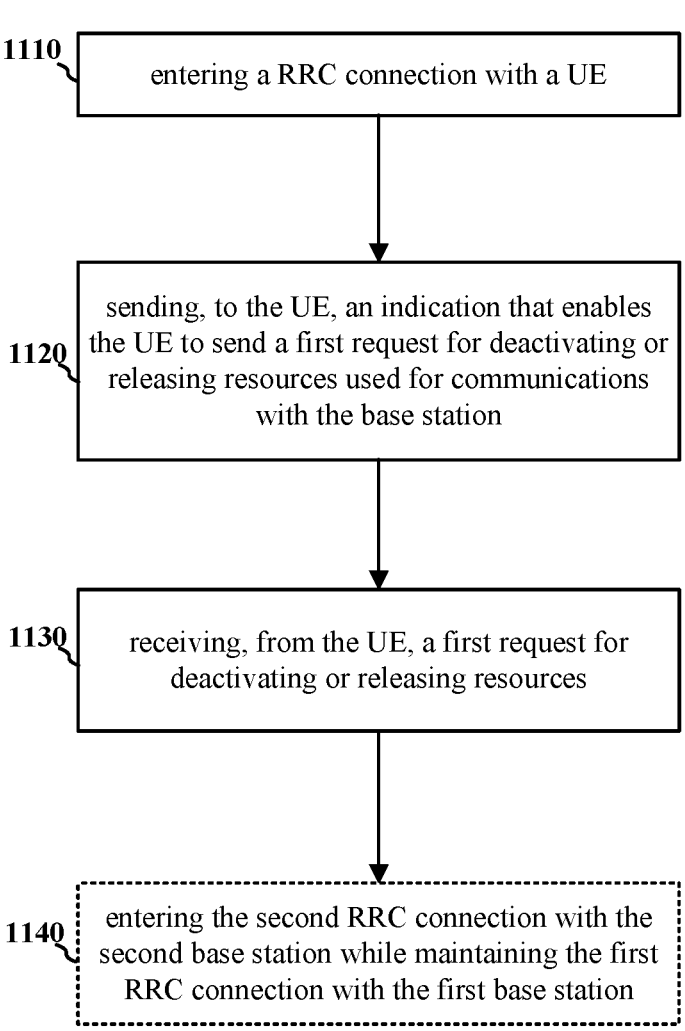

1100

1110  entering a RRC connection with a UE 1120  sending, to the UE, an indication that enables the UE to send a first request for deactivating or releasing resources used for communications with the base station 1130  receiving, from the UE, a first request for deactivating or releasing resources 1140  entering the second RRC connection with the second base station while maintaining the first RRC connection with the first base station

FIG. 11

METHOD AND APPARATUS TO HAVE EFFICIENT RESOURCE SHARING FOR UE WITH MULTIPLE SIM CARDS

CROSS-REFERENCE TO RELATED APPLICATION(S)

This application claims the benefits of U.S. Provisional Application Ser. No. 63/377,356, entitled "METHOD AND APPARATUS TO HAVE EFFICIENT RESOURCE SHARING FOR UE WITH MULTIPLE SIM CARD" and filed on Sep. 28, 2022, which is expressly incorporated by reference herein in their entirety.

BACKGROUND

Field

The present disclosure relates generally to communication systems, and more particularly, to techniques of efficient resource sharing for user equipment (UE) with multiple subscriber identification module (SIM) cards.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE enters a first radio resource control (RRC) connection with a first base station of a first network. The UE receives, from the first base station, an indication that enables the UE to send a first request for deactivating or releasing resources used for communications with the first base station. In response to a determination to enter a second RRC connection with a second base station of a second network, the UE sends, to the first base station, the first request for deactivating or releasing the resources. The UE enters the second RRC connection with the second base station while maintaining the first RRC connection with the first base station.

In certain configurations, in response to a determination to release the second RRC connection with the second base station, the UE sends, to the first base station, a second request for recovering the resources. The UE releases the second RRC connection with the second base station, and recovers the resources in the first RRC connection with the first base station.

In an aspect of the disclosure, a method, a computer-readable medium, and an apparatus are provided. The apparatus may be a base station. In certain configurations, the base station enters a RRC connection with a UE. The base station sends, to the UE, an indication that enables the UE to send a first request for deactivating or releasing resources used for communications with the base station. The base station receives, from the UE, a first request for deactivating or releasing resources.

In certain configurations, the base station further receives, from the UE, a second request for recovering the resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flow chart of a method (process) for wireless communication of a UE.

FIG. 11 is a flow chart of a method (process) for wireless communication of a base station.

DETAILED DESCRIPTION

Figure 1:
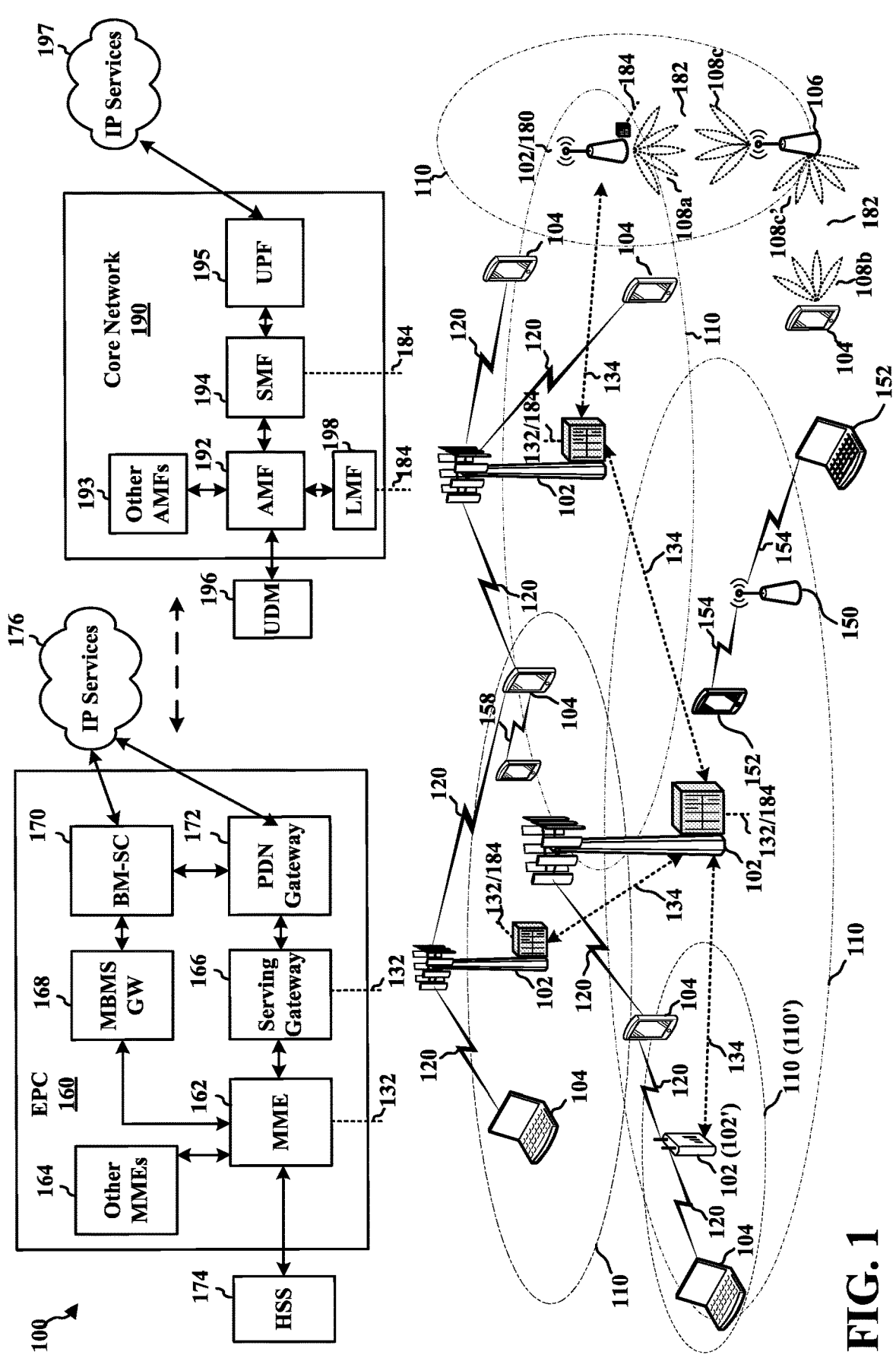
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
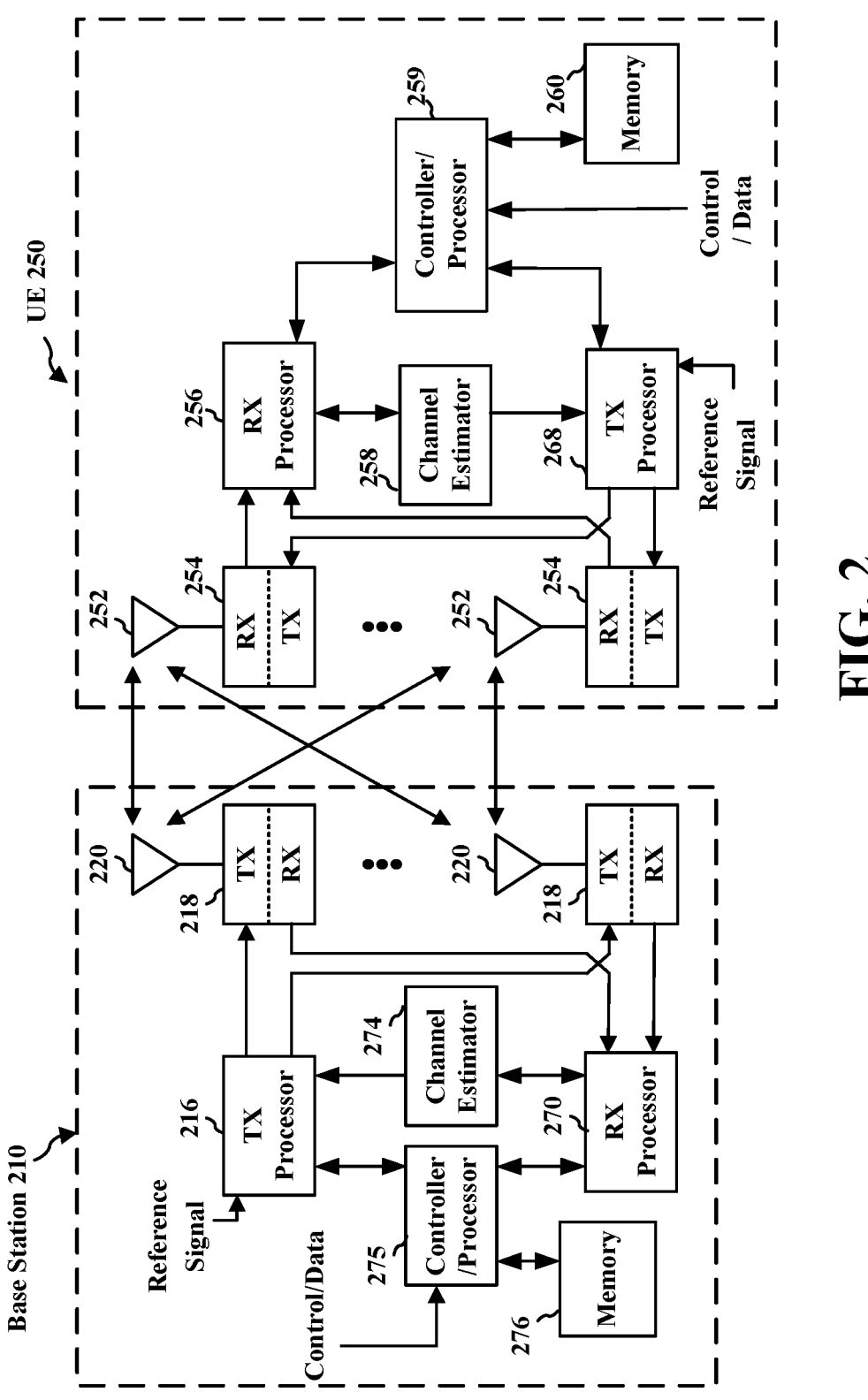
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
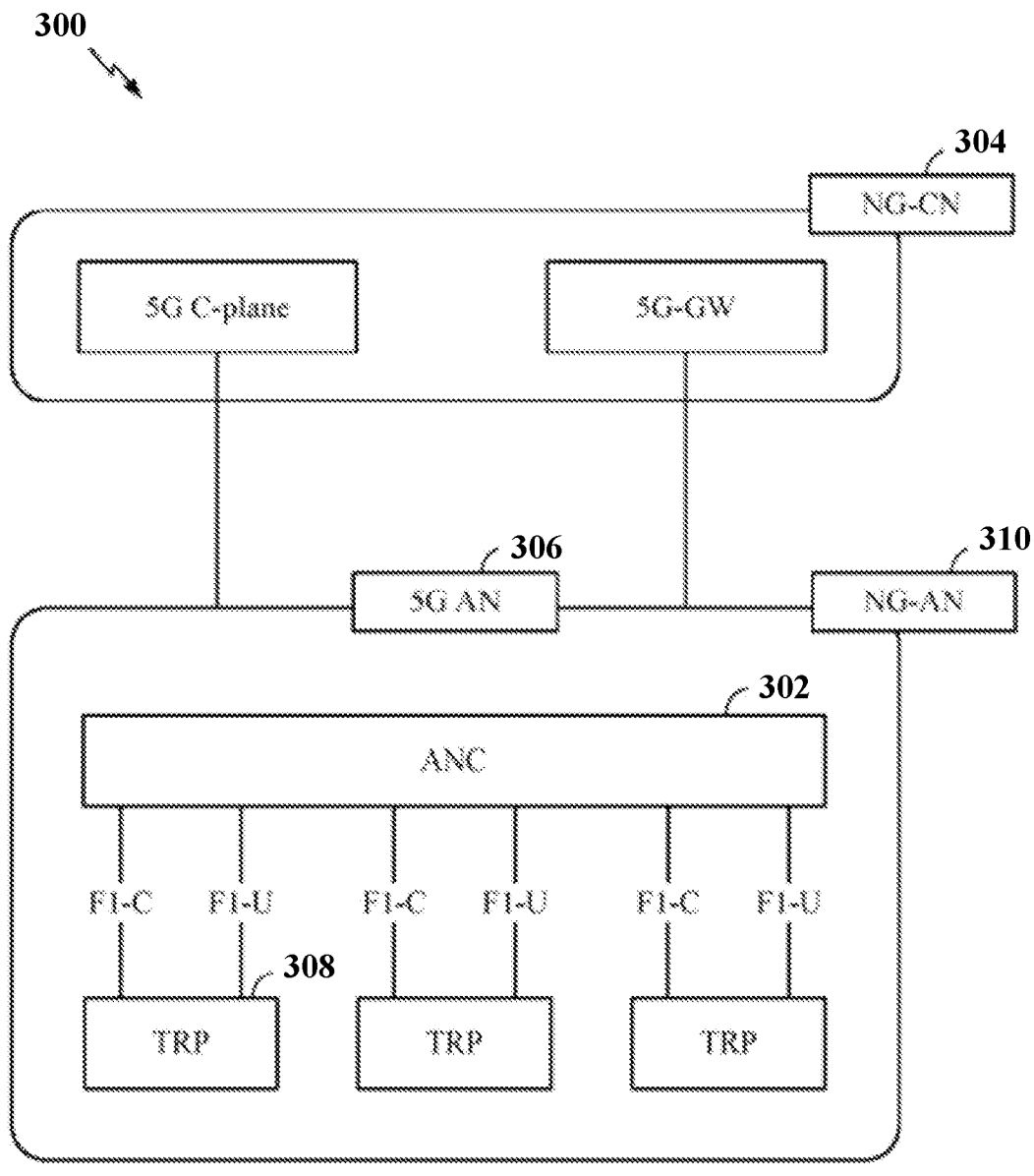
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
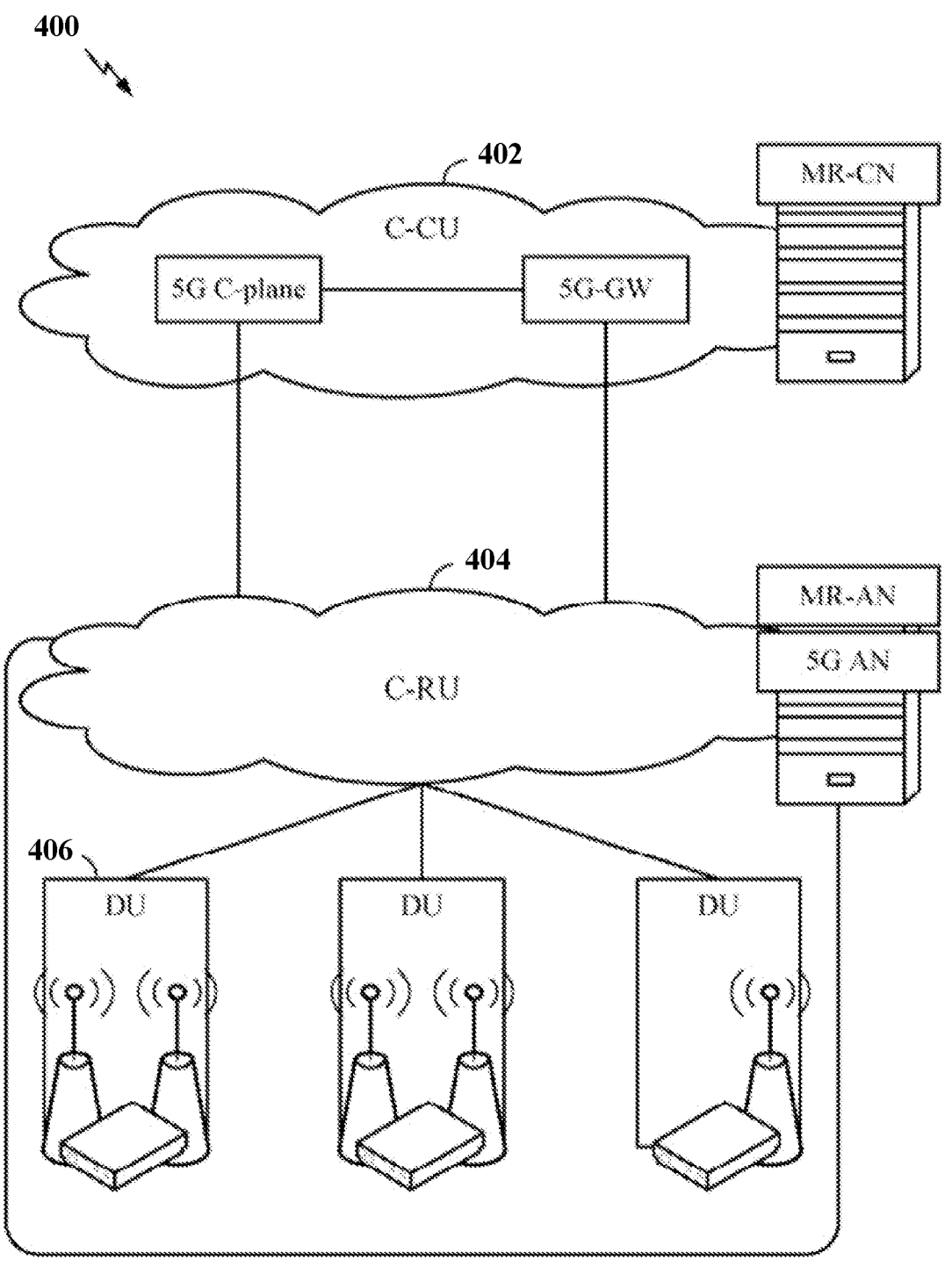
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
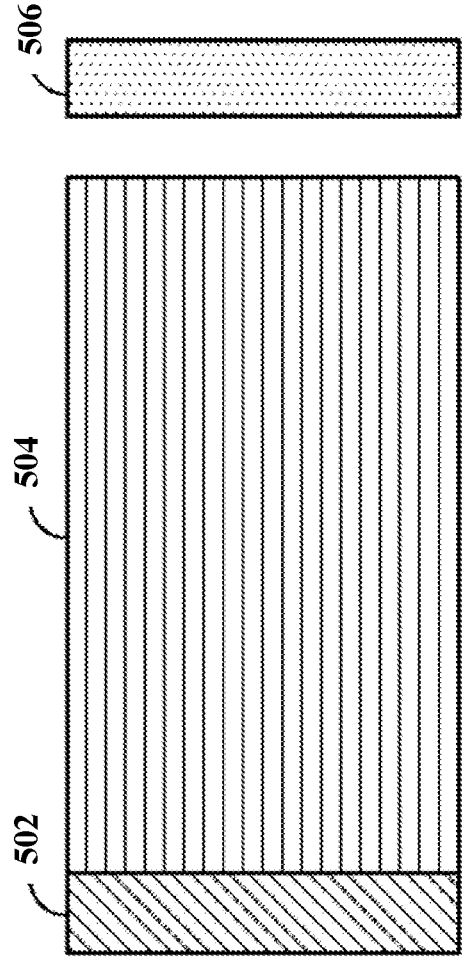
FIG. 5 is a diagram showing an example of a DL-centric slot.
Figure 5:
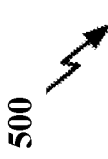
Figure 5:
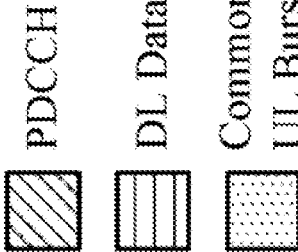

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
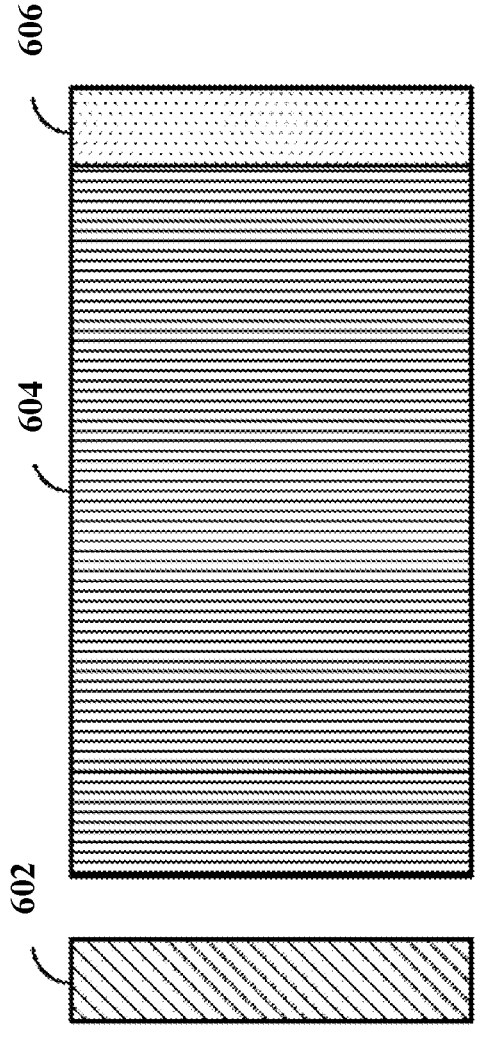
FIG. 6 is a diagram showing an example of an UL-centric slot.
Figure 6:
Figure 6:
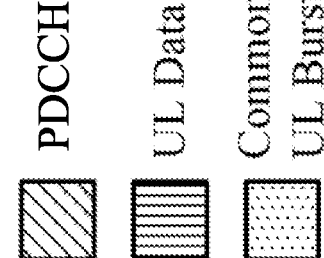

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In some circumstances, a UE may have two or more SIM cards, thus making the UE a Multi-SIM (MUSIM) UE in 3GPP. Currently, the MUSIM UE is popular in the market. A MUSIM UE may register to two different networks and try to comply with the specification from the perspectives of both networks. Before 3GPP R17, the behavior of the MUSIM UE is mostly based on the UE implementation, and 3GPP R17 introduced some MUSIM features to allow better UE-network coordination on the MUSIM scenario. However, these MUSIM features provide optimization that focuses on single-RX UE operation.

For the MUSIM UE, the software and hardware capabilities of the UE are shared by the SIM cards. In other words, the related capabilities need to be split between the SIM cards. For example, the simplest split of the resources is to only allow one SIM card to enter the CONNECTED mode with a corresponding network. Specifically, the R17 Specification allows the UE to indicate its preference for leaving the RRC_CONNECTED mode for MUSIM purposes. However, instead of releasing connection from one SIM card, it is better to keep the CONNECTION of this SIM card with reduced capability, if it is doable by the MUSIM UE. To allow the CONNECTED mode operations in both SIM cards, the UE may have to release some resources, such as the secondary cell (SCell) or the secondary cell group (SCG), from one SIM card, such that the released resources may allow the other SIM card to enter connection with its corresponding network. Thus, it would be beneficial if the UE can indicate some temporary UE capability limitation to the corresponding network for the first SIM card due to entering the CONNECTED mode of the other SIM card.

Figure 7:
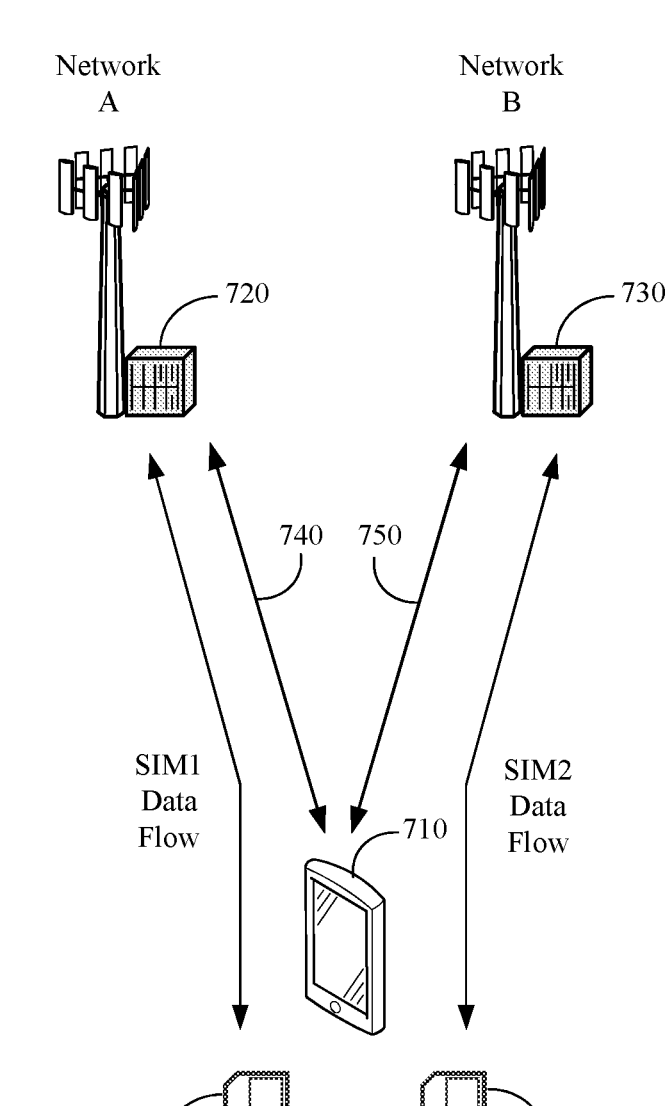
FIG. 7 is a diagram illustrating example communications between a MUSIM UE and two networks.

FIG. 7 is a diagram illustrating example communications between a MUSIM UE and two networks. As shown in FIG. 7, the MUSIM UE 710 is registered to two networks, namely a network A 720 and a network B 730. The MUSIM UE 710 has two SIM cards, including SIM1 712, which is intended to connect with the network A 720, and SIM2 714, which is intended to connect with the network B 730.

In the MUSIM UE 710 as shown in FIG. 7, a UE-triggered capability limitation procedure may be available for the MUSIM purpose, allowing connection operations to be simultaneously carried out in both networks A and B. A RRC connection between a UE and a base station (network) refers to that the UE is in an RRC connected mode with the base station. For example, the SIM1 712 of the MUSIM UE 710 is already in a RRC connection 740 with the network A 720. In this case, if the SIM2 714 of the MUSIM UE 710 intends to enter another RRC connection 750 with the network B 730, the MUSIM UE 710 may perform the capability limitation procedure by indicating the temporary UE capability limitation to the network A 720, such that the MUSIM UE 710 may deactivate or release some shared radio resources and perform a connection setup in the SIM2 714 to establish the RRC connection 750 with the network B 730 with the released resources. Specifically, the SIM2 714 will occupy the released resources in establishing the corresponding RRC connection 750, and the shared radio resources are defined based on the number of supported carriers. Similarly, if the MUSIM UE 710 is leaving the RRC connection 750 with the network B 730, the MUSIM UE 710 must update the temporary UE capability limitation to the network A 720, such that the MUSIM UE 710 may recover the capability limitation.

In certain embodiments, the indication and update of the temporary UE capability limitation may be achieved by the MUSIM UE 710 sending the network A 720 a reduced capability indicator, which indicates the temporary UE capability limitation, or a recovery capability indicator, which indicates the recovery of the capability limitation. In one embodiment, the reduced capability indicator may be a SCell deactivation request, and the recovery capability indicator may be a SCell activation request.

Figure 8:
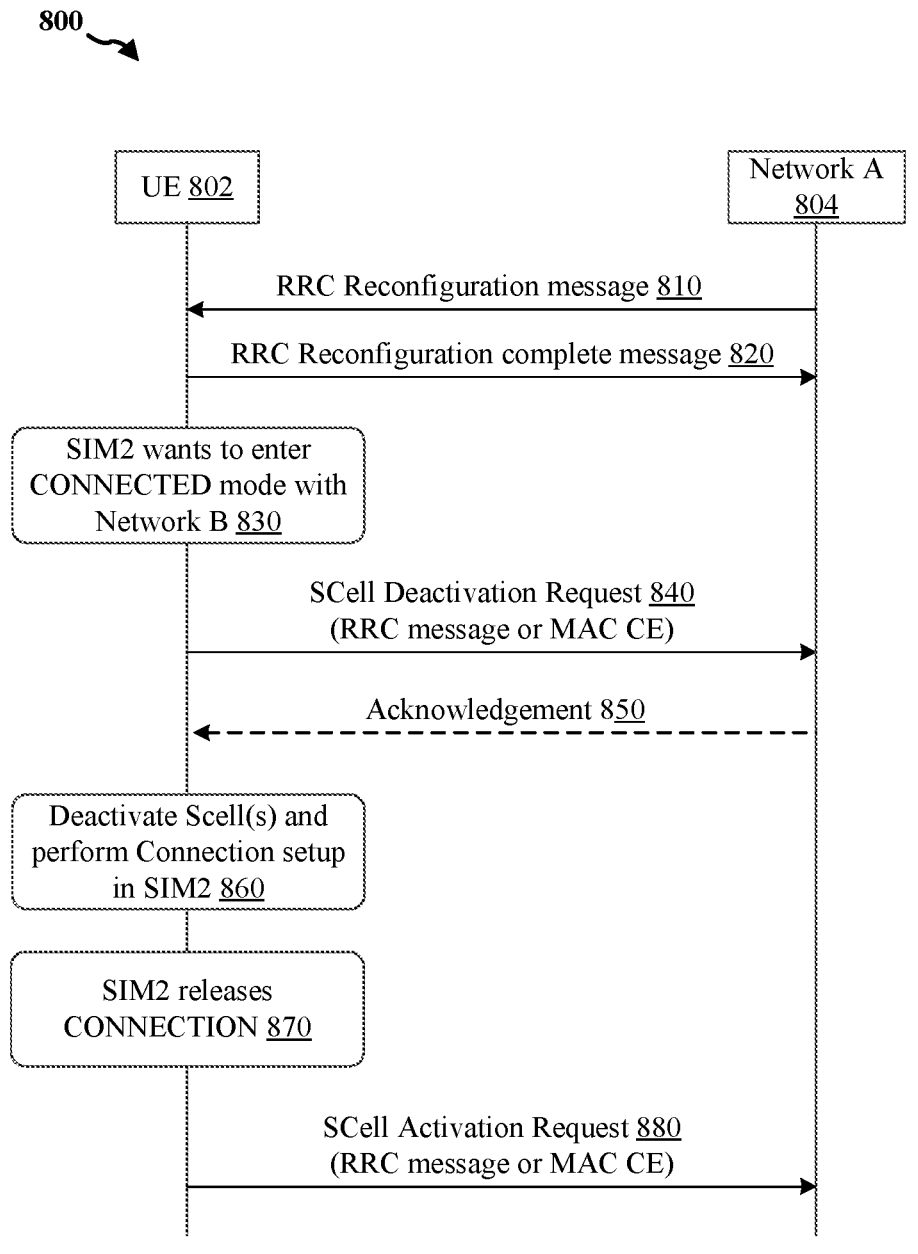
FIG. 8 is a diagram illustrating example communications between a MUSIM UE and a network in a UE-triggered capability limitation procedure according to one embodiment.

FIG. 8 is a diagram illustrating example communications between a MUSIM UE and a network in a UE-triggered capability limitation procedure according to one embodiment. As shown in FIG. 8, in the UE-triggered capability limitation procedure 800, the UE 802, which may be the MUSIM UE 710 as shown in FIG. 7, is already in a RRC connection with a base station of the network A 804, which may be the network A 720 as shown in FIG. 7. Specifically, the UE 802 may use carrier aggregation to communicate with the network A 804 through one primary cell (PCell), which carries traffic for the user of the UE 802 and signaling messages for the UE 802, and which operates in both the uplink and downlink; and one or more secondary cells (SCells), which carry only traffic and operate either in the uplink and downlink or in the downlink alone. In this case, the PCell and the SCells are controlled by the base station of the network A 804 and are transmitted on different radio frequencies to ensure that they do not interfere with each other. It should be noted that the network A 804 controls whether the UE-triggered capability limitation procedure in the UE 802 is enabled. At operation 810, the network A 804 sends a RRC reconfiguration message to the UE 802, and the RRC reconfiguration message includes information that enables the UE 802 to send the SCell deactivation request and the SCell activation request to the network A 804 for the MUSIM purpose. In other words, the operation 810 enables the UE-triggered capability limitation procedure in the UE 802. At operation 820, in response to the RRC reconfiguration message, the UE 802 sends a RRC reconfiguration complete message back to the network A 804 to acknowledge the reconfiguration.

At operation 830, the SIM2 714 of the UE 802 wants to enter a CONNECTED mode with the network B 730. In response to this determination, at operation 840, the UE 802 sends a SCell deactivation request (i.e., the reduced capability indicator) to the network A 804 to indicate the temporary UE capability limitation. In certain embodiments, the SCell deactivation request may be transmitted by a MAC control element (CE). Specifically, the MAC CE is a special MAC structure carrying the control information through the communication path at the MAC layer, allowing the UE 802 and the network A 804 for fast signaling communication exchange without involving upper layers. In certain embodiments, the SCell deactivation request may be transmitted by a RRC message, such as a UE assistance information message. Specifically, the UE assistance information message is a special RRC message by which the UE 802 can inform various internal status to the network A 804, such that the network A 804 can assign or control the resources better fit for each connected UE.

After the UE 802 send the SCell deactivation request to the network A 804 and the network A 804 receives the SCell deactivation request sent by the UE 802, optionally, at operation 850, the network A 804 may send an acknowledgement of the SCell deactivation request back to the UE 802 to confirm receipt of the SCell deactivation request. Then, at operation 860, the UE 802 deactivates one or more SCells and starts performing the connection setup in the SIM2 714. In certain embodiments, to avoid service failure due to late connection setup in the SIM2 714 with the network B 730, the UE 802 may deactivate the SCell immediately after sending the SCell deactivation request. Alternatively, in certain embodiments, the UE 802 may wait for a time period after sending the SCell deactivation request, before deactivating the SCell autonomously, thus ensuring the network A 804 to receive the Scell deactivation request. Alternatively, in certain embodiments, the UE 802 may deactivate the SCell in response to receiving the acknowledgement from the network A 804. In other words, the UE 802 waits until receiving the acknowledgement from the network A 804 before deactivating the SCell autonomously, thus ensuring the network A 804 to confirm the receipt the Scell deactivation request. After the UE performs the connection setup in the SIM2 714, both SIM cards on the UE 802 may be simultaneously connected.

After the SIM2 714 on the UE 802 completes the tasks in the connection with the network B 730, at operation 870, the SIM2 714 releases the corresponding connection. In this case, the deactivated SCell will be re-activated. Thus, at operation 880, the UE 802 sends a SCell activation request (i.e., the recovery capability indicator) to the network A 804 to indicate the recovery of the capability limitation. In certain embodiments, similar to the SCell deactivation request, the SCell activation request may be transmitted by a MAC CE or a RRC message, such as a UE assistance information message. Subsequently, the UE 802 may activate the one or more SCells. Similar to the SCell deactivation procedure, in one embodiment, the UE 802 may activate the SCell immediately after sending the SCell activation request. Alternatively, in certain embodiments, the UE 802 may wait for a time period after sending the SCell activation request, before activating the SCell autonomously. Alternatively, in certain embodiments, the UE 802 may activate the SCell in response to receiving, from the network A 804, an acknowledgement indicating that the network A 804 receives the SCell activation request.

In the embodiment as shown in FIG. 8, the UE 802 sends the SCell deactivation request to the network A 804 to deactivate the one or more SCells, such that the deactivated SCells may be later re-activated. In certain configurations, instead of merely deactivating the SCells, the UE 802 may choose the option to release the one or more SCells (i.e., removing the SCells from the PCell) such that the released SCells may be available for the network B. Specifically, the UE 802 cannot achieve the SCell release autonomously. Instead, the base station of the network A 804 may achieve the SCell release through an additional RRC connection reconfiguration procedure, in which the base station sends a SCell to release list to the UE 802 to release the one or more SCells.

Figure 9:
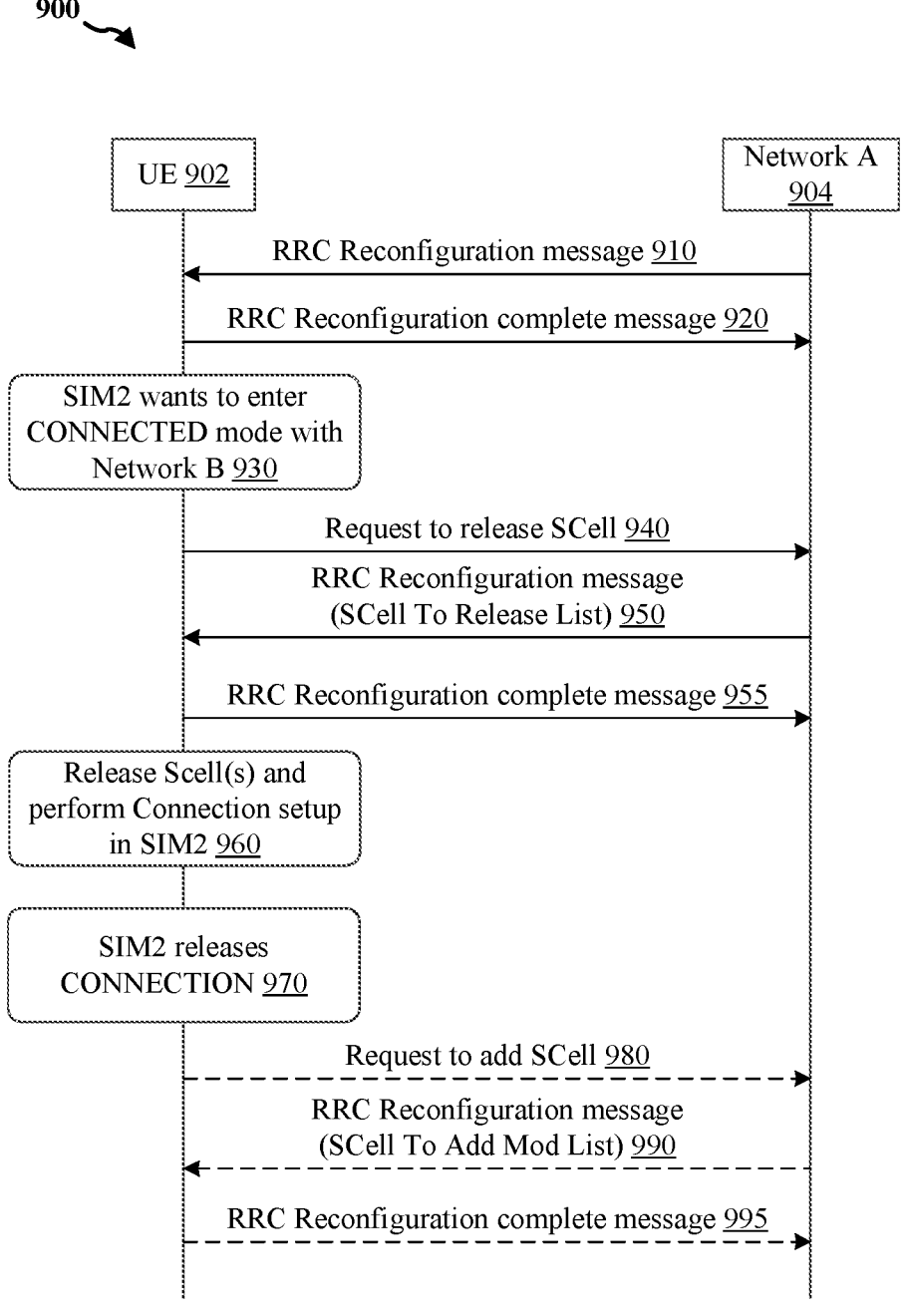
FIG. 9 is a diagram illustrating example communications between a MUSIM UE and a network in a UE-triggered capability limitation procedure according to another embodiment.

FIG. 9 is a diagram illustrating example communications between a MUSIM UE and a network in a UE-triggered capability limitation procedure according to another embodiment. As shown in FIG. 9, in the UE-triggered capability limitation procedure 900, the UE 902, which may be the MUSIM UE 710 as shown in FIG. 7, is already in a RRC connection with a base station of the network A 904, which may be the network A 720 as shown in FIG. 7. In the procedure 900 as shown in FIG. 9, the network A 904 controls whether the UE-triggered capability limitation procedure in the UE 902 is enabled. Specifically, at operation 910, the network A 904 sends a RRC reconfiguration message to the UE 902, and the RRC reconfiguration message includes information that enables the UE 902 to send a request for releasing the SCell(s) and/or a request for re-adding the SCells to the network A 904 for the MUSIM purpose. In other words, the operation 910 enables the UE-triggered capability limitation procedure in the UE 902. At operation 920, in response to the RRC reconfiguration message, the UE 902 sends a RRC reconfiguration complete message back to the network A 904 to acknowledge the reconfiguration.

At operation 930, the SIM2 714 of the UE 902 wants to enter a CONNECTED mode with the network B 730. In response to this determination, at operation 940, the UE 902 sends a request to release the SCell(s) (i.e., the reduced capability indicator) to the network A 904 to indicate the intent to release the SCell(s). The request may be transmitted by a MAC CE or a RRC message, such as a UE assistance information message.

In response to this request, Similar to the procedure 800 as shown in FIG. 8, the SCell deactivation request may be transmitted by a MAC CE or a RRC message, such as a UE assistance information message.

After the network A 904 receives the request to release the SCell(s) sent by the UE 902, at operation 950, the network A 904 sends another RRC Reconfiguration message to the UE 902. Specifically, the RRC reconfiguration message at operation 950 includes a SCell to release list indicating the SCell(s) to be released. At operation 955, when the UE 902 receives the RRC Reconfiguration message with the SCell to release list, the UE 902 sends a RRC reconfiguration complete message back to the network A 904 to acknowledge the reconfiguration. Then, at operation 960, the UE 902 releases the one or more SCells according to the SCell to release list, and starts performing the connection setup in the SIM2 714.

After the SIM2 714 on the UE 902 completes the tasks in the connection with the network B 730, at operation 970, the SIM2 714 releases the corresponding connection with the network B 730. In this case, the released SCell(s) maintain released. Optionally, at operation 980, the UE 902 may send a request to add the one or more SCells to the network A 904 with the intent to add the released SCell(s) back. In certain embodiments, similar to the request to release the SCell(s), the request to add the SCell(s) may be transmitted by a MAC CE or a RRC message, such as a UE assistance information message.

After the network A 904 receives the request to add the SCell(s) sent by the UE 902, at operation 990, the network A 904 sends yet another RRC Reconfiguration message to the UE 902. Specifically, the RRC reconfiguration message at operation 990 includes a SCell to add/modify list indicating the SCell(s) to be added. At operation 995, when the UE 902 receives the RRC Reconfiguration message with the SCell to add/modify list, the UE 902 sends a RRC reconfiguration complete message back to the network A 904 to acknowledge the reconfiguration. Then, the UE 902 may add the one or more SCells back according to the SCell to add/modify list, and continue the connection with the network A 904.

FIG. 10 is a flow chart of a method (process) for wireless communication of a UE. The method may be performed by a UE (e.g., the UE 710). At operation 1010, the UE enters a first RRC connection with a first base station of a first network. At operation 1020, the UE receives, from the first base station, an indication that enables the UE to send a first request for deactivating or releasing resources used for communications with the first base station. At operation 1030, in response to a determination to enter a second RRC connection with a second base station of a second network, the UE sends, to the first base station, the first request for deactivating or releasing the resources. At operation 1040, the UE enters the second RRC connection with the second base station while maintaining the first RRC connection with the first base station. Optionally, at operation 1050, in response to a determination to release the second RRC connection with the second base station, the UE sends, to the first base station, a second request for recovering the resources. Optionally, at operation 1060, the UE releases the second RRC connection with the second base station, and recovers the resources in the first RRC connection with the first base station.

In certain configurations, in response to the determination to enter the second RRC connection with the second base station, the UE may send, to the first base station, the first request for deactivating the resources. The resources include one or more SCells on the UE. The first request for deactivating the resources is a SCell deactivation request, and the second request for recovering the resources is a SCell activation request.

In certain configurations, each of the SCell deactivation request and the SCell activation request is transmitted by a MAC CE or by a RRC message, which may be a UE assistance information message.

In certain configurations, optionally, the UE may deactivate the one or more SCells on the UE immediately after sending the SCell deactivation request to the first base station. Alternatively, the UE may deactivate the one or more SCells autonomously after a time period after sending the SCell deactivation request to the first base station. Alternatively, the UE may receive, from the first base station, an acknowledgement of the SCell deactivation request, and deactivate the one or more SCells on the UE in response to the acknowledgement.

In certain configurations, optionally, in response to the determination to enter the second RRC connection with the second base station, the UE may send, to the first base station, the first request for releasing the resources. The resources include one or more SCells. The UE may receive, from the first base station, a second indication that enables the UE to release the one or more SCells. The UE may release the one or more SCells according to the second indication.

FIG. 11 is a flow chart of a method (process) for wireless communication of a base station. The method may be performed by a base station (e.g., the base station 720 of the network A). At operation 1110, the base station enters a RRC connection with a UE. At operation 1120, the base station sends, to the UE, an indication that enables the UE to send a first request for deactivating or releasing resources used for communications with the base station. At operation 1130, the base station receives, from the UE, a first request for deactivating or releasing resources. Optionally, at operation 1140, the base station further receives, from the UE, a second request for recovering the resources.

In certain configurations, the base station may receive, from the UE, the first request for deactivating the resources. The resources include one or more SCells on the UE. The first request is a SCell deactivation request, and the second request is a SCell activation request.

In certain configurations, each of the SCell deactivation request and the SCell activation request is transmitted by a MAC CE or by a RRC message, which may be a UE assistance information message.

In certain configurations, after receiving the SCell deactivation request from the UE, the base station may send an acknowledgement of the SCell deactivation request to the UE.

In certain configurations, the base station may receive, from the UE, the first request for releasing the resources. The resources include one or more SCells. In response to the first request, the base station may send, to the UE, a second indication that enables the UE to release the one or more SCells on the UE.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

entering a first radio resource control (RRC) connection with a first base station of a first network;

receiving, from the first base station, an indication that enables the UE to send a first request for deactivating or releasing one or more secondary cells (SCells) configured for the first RRC connection;

in response to a determination to enter a second RRC connection with a second base station of a second network, sending, to the first base station, the first request for deactivating or releasing the one or more SCells; and entering the second RRC connection with the second base station while maintaining the first RRC connection with the first base station via at least a primary cell (PCell) with the one or more SCells deactivated or released.

2. The method of claim 1, further comprising:

in response to a determination to release the second RRC connection with the second base station, sending, to the first base station, a second request for recovering the one or more SCells; and releasing the second RRC connection with the second base station, and recovering the one or more SCells in the first RRC connection with the first base station.

3. The method of claim 2, comprising:

in response to the determination to enter the second RRC connection with the second base station, sending, to the first base station, the first request for deactivating the one or more SCells, wherein the first request for deactivating the one or more SCells is a SCell deactivation request, and the second request for recovering the one or more SCells is a SCell activation request.

4. The method of claim 3, wherein each of the SCell deactivation request and the SCell activation request is transmitted by a medium access control (MAC) control element (CE).

5. The method of claim 3, wherein each of the SCell deactivation request and the SCell activation request is transmitted by a RRC message.

6. The method of claim 5, wherein the RRC message is a UE assistance information message.

7. The method of claim 3, further comprising:

deactivating the one or more SCells on the UE immediately after sending the SCell deactivation request to the first base station, or deactivating the one or more SCells autonomously after a time period after sending the SCell deactivation request to the first base station; or receiving, from the first base station, an acknowledgement of the SCell deactivation request, and deactivating the one or more SCells on the UE in response to the acknowledgement.

8. The method of claim 1, comprising:

in response to the determination to enter the second RRC connection with the second base station, sending, to the first base station, the first request for releasing the one or more SCells;

receiving, from the first base station, a second indication that enables the UE to release the one or more SCells; and releasing the one or more SCells according to the second indication.

9. A method of wireless communication of a base station, comprising:

entering a radio resource control (RRC) connection with a user equipment (UE);

sending, to the UE, an indication that enables the UE to send a first request for deactivating or releasing one or more secondary cells (SCells) configured for the RRC connection; and receiving, from the UE, the first request for deactivating or releasing the one or more SCells, wherein the RRC connection with the UE is maintained via at least a primary cell (PCell) while the one or more SCells are deactivated or released.

10. The method of claim 9, further comprising:

receiving, from the UE, a second request for recovering the one or more SCells.

11. The method of claim 10, comprising:

receiving, from the UE, the first request for deactivating the one or more SCells, wherein the first request is a SCell deactivation request, and the second request is a SCell activation request.

12. The method of claim 11, wherein each of the SCell deactivation request and the SCell activation request is received from the UE in a medium access control (MAC) control element (CE).

13. The method of claim 11, wherein each of the SCell deactivation request and the SCell activation request is received from the UE in a RRC message.

14. The method of claim 13, wherein the RRC message is a UE assistance information message.

15. The method of claim 11, further comprising:

after receiving the SCell deactivation request from the UE, sending an acknowledgement of the SCell deactivation request to the UE.

16. The method of claim 11, comprising:

receiving, from the UE, the first request for releasing the one or more SCells;

in response to the first request, sending, to the UE, a second indication that enables the UE to release the one or more SCells.

17. An apparatus for wireless communication, the apparatus being a user equipment (UE), comprising:

a memory; and at least one processor coupled to the memory, the processor being configured to:

enter a first radio resource control (RRC) connection with a first base station of a first network;

receive, from the first base station, an indication that enables the UE to send a first request for deactivating or releasing one or more secondary cells (SCells) configured for the first RRC connection;

in response to a determination to enter a second RRC connection with a second base station of a second network, send, to the first base station, the first request for deactivating or releasing the one or more SCells; and enter the second RRC connection with the second base station while maintaining the first RRC connection with the first base station via at least a primary cell (PCell) with the one or more SCells deactivated or released.

18. The apparatus of claim 17, wherein the processor is further configured to:

in response to a determination to release the second RRC connection with the second base station, send, to the first base station, a second request for recovering the one or more SCells; and release the second RRC connection with the second base station, and recover the one or more SCells in the first RRC connection with the first base station.

19. The apparatus of claim 18, wherein the processor is configured to:

in response to the determination to enter the second RRC connection with the second base station, send, to the first base station, the first request for deactivating the one or more SCells, wherein the first request for deactivating the one or more SCells is a SCell deactivation request, and the second request for recovering the one or more SCells is a SCell activation request.

20. The apparatus of claim 19, wherein each of the SCell deactivation request and the SCell activation request is transmitted by a medium access control (MAC) control element (CE) or by a RRC message.

*   *   *   *   *